United States Patent
Fusari et al.

(10) Patent No.: US 10,202,168 B2
(45) Date of Patent: Feb. 12, 2019

(54) BICYCLE ELECTRONIC SYSTEM

(71) Applicant: Campagnolo S.r.l., Vicenza (IT)

(72) Inventors: Flavio Fusari, Vicenza (IT); Flavio Cracco, Vicenza (IT)

(73) Assignee: CAMPAGNOLO S.R.L., Vicenza (IT)

( * ) Notice: Subject to any disclaimer, the term of this patent is extended or adjusted under 35 U.S.C. 154(b) by 23 days.

(21) Appl. No.: 14/541,480

(22) Filed: Nov. 14, 2014

(65) Prior Publication Data
US 2015/0137591 A1 May 21, 2015

(30) Foreign Application Priority Data
Nov. 15, 2013 (IT) .............................. MI2013A1902

(51) Int. Cl.
*B62M 25/08* (2006.01)

(52) U.S. Cl.
CPC .................................. *B62M 25/08* (2013.01)

(58) Field of Classification Search
CPC .............................. B62M 25/08; B62M 25/04
See application file for complete search history.

(56) References Cited

U.S. PATENT DOCUMENTS

| | | | |
|---|---|---|---|
| 3,919,891 A | 11/1975 | Stuhlmuller et al. | |
| 5,115,143 A * | 5/1992 | Rohulich | H03K 17/6872 327/109 |
| 5,213,548 A | 5/1993 | Colbert et al. | |
| 6,741,045 B2 * | 5/2004 | Kitamura | B62M 25/08 318/14 |
| 6,757,567 B2 | 6/2004 | Campagnolo et al. | |
| 7,123,522 B2 * | 10/2006 | Ho | G11C 5/144 365/189.11 |
| 7,406,367 B2 | 7/2008 | Uno | |
| 8,143,849 B2 * | 3/2012 | Miglioranza | H02J 7/0068 320/107 |

(Continued)

FOREIGN PATENT DOCUMENTS

| | | |
|---|---|---|
| EP | 1630095 A2 | 3/2006 |
| EP | 2072091 A1 | 6/2009 |

(Continued)

OTHER PUBLICATIONS

Merriam-Webster, "definition of slash", pp. 1-3.*

(Continued)

*Primary Examiner* — Thienvu Tran
*Assistant Examiner* — Pinping Sun
(74) *Attorney, Agent, or Firm* — Volpe and Koenig, P.C.

(57) ABSTRACT

A bicycle electronic system comprising a battery unit, at least one operating unit and a power supply and communication bus, each of said units being connected to said bus is provided. The system comprises first means or controller for switching-off/(re)switching-on able to be activated/deactivated by a user and second means or controller for switching-off/(re)switching-on suitable for disconnecting/connecting said battery unit from/to said power supply and communication bus in response to the activation/deactivation of said first means or controller for switching-off/(re)switching-on. A battery unit and a method for switching-off/(re)switching-on a bicycle electronic system are also described.

18 Claims, 3 Drawing Sheets

(56) References Cited

U.S. PATENT DOCUMENTS

| | | | | |
|---|---|---|---|---|
| 8,476,838 B2* | 7/2013 | Matsui | ............... | H05B 33/0887 |
| | | | | 315/200 R |
| 9,126,495 B2 | 9/2015 | Sugiyama et al. | | |
| 9,227,697 B2 | 1/2016 | Matsumoto et al. | | |
| 2004/0220002 A1* | 11/2004 | Guderzo | .................. | B62J 99/00 |
| | | | | 474/80 |
| 2005/0029033 A1* | 2/2005 | Rip | ........................... | B62H 5/20 |
| | | | | 180/220 |
| 2006/0047372 A1* | 3/2006 | Uno | .......................... | B62J 99/00 |
| | | | | 701/1 |
| 2006/0082221 A1* | 4/2006 | Mouzas | ............... | B60Q 1/0082 |
| | | | | 307/10.1 |
| 2006/0132089 A1* | 6/2006 | Ambrosio | ............ | H02J 7/0014 |
| | | | | 320/107 |
| 2006/0226879 A1* | 10/2006 | Kitamura | ................. | B62J 6/003 |
| | | | | 327/94 |
| 2008/0042621 A1* | 2/2008 | Miglioranza | ......... | H02J 7/1407 |
| | | | | 320/150 |
| 2008/0048611 A1* | 2/2008 | Miglioranza | ......... | H02J 7/0068 |
| | | | | 320/107 |
| 2009/0170660 A1* | 7/2009 | Miglioranza | .......... | A63B 24/00 |
| | | | | 482/1 |
| 2010/0164334 A1* | 7/2010 | Schiller | ...................... | B62J 6/08 |
| | | | | 310/75 C |
| 2011/0140911 A1* | 6/2011 | Pant | ....................... | H04B 3/546 |
| | | | | 340/870.02 |
| 2011/0267178 A1* | 11/2011 | Nishihara | ............... | B62K 23/02 |
| | | | | 340/12.39 |
| 2012/0119701 A1* | 5/2012 | Igata | .................. | B60L 11/1816 |
| | | | | 320/109 |
| 2012/0221205 A1 | 8/2012 | Ichida et al. | | |
| 2012/0253600 A1* | 10/2012 | Ichida | .................... | B62M 25/08 |
| | | | | 701/37 |
| 2013/0027052 A1 | 1/2013 | Matsumoto et al. | | |
| 2013/0030603 A1* | 1/2013 | Hashimoto | ............ | B62M 25/08 |
| | | | | 701/1 |
| 2013/0193754 A1* | 8/2013 | Sugiyama | ............ | H02H 11/003 |
| | | | | 307/10.7 |
| 2014/0030929 A1* | 1/2014 | Cracco | ................... | H01R 29/00 |
| | | | | 439/638 |
| 2014/0358385 A1 | 12/2014 | Fusari et al. | | |

FOREIGN PATENT DOCUMENTS

| | | |
|---|---|---|
| EP | 2808238 A1 | 12/2014 |
| JP | 2006062643 A | 3/2006 |
| JP | 2012-179975 A | 9/2012 |
| JP | 2013032028 A | 2/2013 |
| JP | 2013066321 A | 4/2013 |

OTHER PUBLICATIONS

Italian Search Report and Written Opinion in Italian Application No. IT MI2013A001902, dated Jul. 25, 2014 with English translation.
Chinese Office Action with English translation for Chinese Application No. 201410652907.6, dated Apr. 5, 2017.
Japanese Office Action with English translation for Japanese Application No. 2014-231401, dated Jan. 30, 2018.
Japanese Office Action for Japanese Application No. 2014-231401, dated Oct. 9, 2018.

* cited by examiner

BICYCLE ELECTRONIC SYSTEM

CROSS REFERENCE TO RELATED APPLICATION(S)

This application claims the benefit of Italian Application No. MI2013A001902, which was filed on Nov. 15, 2013, and is incorporated herein by reference as if fully set forth.

FIELD OF INVENTION

The present invention relates to a bicycle electronic system, in particular a bicycle electronic gearshift. In particular, the invention relates to a bicycle electronic system having a remote switching-off/(re)switching-on device. The invention also refers to a battery unit configured for insertion into the bicycle electronic system. The invention also refers to a method for remotely switching-off/(re)switching-on a bicycle electronic system.

BACKGROUND

A motion transmission system in a bicycle comprises a chain extending between toothed wheels associated with the axle of the pedal cranks and with the hub of the rear wheel. When there is more than one toothed wheel at at least one of the axle of the pedal cranks and the hub of the rear wheel, and the motion transmission system is therefore provided with a gearshift, a front derailleur and/or a rear derailleur are provided for. In the case of an electronically servo-assisted gearshift, each derailleur comprises a chain guide element, also known as cage, movable to move the chain among the toothed wheels in order to change the gear ratio, and an electromechanical actuator to move the chain guide element. The actuator in turn typically comprises a motor, typically an electric motor, coupled with the chain guide element through a linkage such as an articulated parallelogram, a rack system or a worm screw system, as well as a sensor of the position, speed and/or acceleration of the rotor or of any moving part downstream of the rotor, down to the chain guide element itself. It is worthwhile noting that slightly different terminology from that used in this context is also in use.

Control electronics changes the gear ratio automatically, for example based on one or more detected variables, such as the travel speed, the cadence of rotation of the pedal cranks, the torque applied to the pedal cranks, the slope of the travel terrain, the heart rate of the cyclist and similar, and/or the gear ratio is changed based on commands manually input by the cyclist through suitable control members, for example levers and/or buttons.

A device for controlling the front derailleur and a device for controlling the rear derailleur—or just one of the two in the case of simpler gearshifts—are mounted so as to be easy for the cyclist to manoeuvre, normally on the handlebars, close to the handgrips thereof where the brake lever is also located for driving the front and rear wheel brake, respectively. Control devices that allow to drive both a derailleur in the two directions and a brake are commonly called integrated controls.

By convention, the device for controlling the front derailleur and the brake lever of the front wheel are located close to the left handgrip of the handlebar, and vice-versa the device for controlling the rear derailleur and the brake lever of the rear wheel are located close to the right handgrip.

The aforementioned components are located on-board the bicycle and must communicate with one another. Moreover, the aforementioned components must be powered.

U.S. application Ser. No. 14/290,646, which is incorporated herein by reference as if fully set forth and which claims priority to Italian Application No. MI2013A000895, discloses a bicycle electronic system, typically comprising a battery unit, a manual command management unit, a derailleur management unit, and a power supply and communication bus, each of said units being connected to said bus. The bicycle electronic system can include other management unit or units of a different type selected from the group consisting of a computer cycle, a sensor unit, a logging unit, a peripheral unit, all connected to the supply and communication bus.

In such a known bicycle electronic system, each unit other than the battery unit comprises a processor and is suitable for transmitting and receiving messages over the power supply and communication bus according to a communication protocol. Such communication protocol provides, for example, that there is a single unit transmitting at one time and that all of the units are constantly able to receive.

Such a distributed architecture makes it possible to avoid a central processing unit, as well as to easily expand the system. Moreover, the power supply is advantageously shared by all of the units.

However, the Applicant has now recognised that, when the bicycle stays immobile for a long period of time, typically in the winter, the aforementioned electronic system stays in a so-called "dormant" or "standby" state. In such a state, the various units connected to the power supply and communication bus, for example the respective processor, continue to absorb current from the battery unit, which thus tends to run down. This problem is increased in severity as the number of units of the bicycle electronic system increases. The same drawback is also encountered in the case of the absence of a processor in each unit, due to the absorption of current by other components of the various units.

The problem at the basis of the invention is therefore that of avoiding the aforementioned drawback, in particular by providing a bicycle electronic system having a device for switching-off/(re)switching-on, and a method for switching-off/(re)switching-on, which are easy for the user to use and that at the same time ensure high reliability of operation.

SUMMARY OF THE INVENTION

The present invention concerns a bicycle electronic system and a method for switching-off/(re)switching-on the same, as well as a battery unit; preferred characteristics of the bicycle electronic system and of the method for remote switching-off/(re)switching-on.

BRIEF DESCRIPTION OF THE DRAWING(S)

Further features and advantages of the present invention will become clearer from the following detailed description of some preferred embodiments thereof, made with reference to the attached drawings. The different features in the individual configurations can be combined together as desired. In such drawings FIG. 1 is a block diagram of a bicycle electronic system according to the invention;

In the following description, for the illustration of the figures, identical or similar reference numerals are used to indicate constructive elements with the same or analogous function.

DETAILED DESCRIPTION OF THE PREFERRED EMBODIMENT(S)

Figure 1:
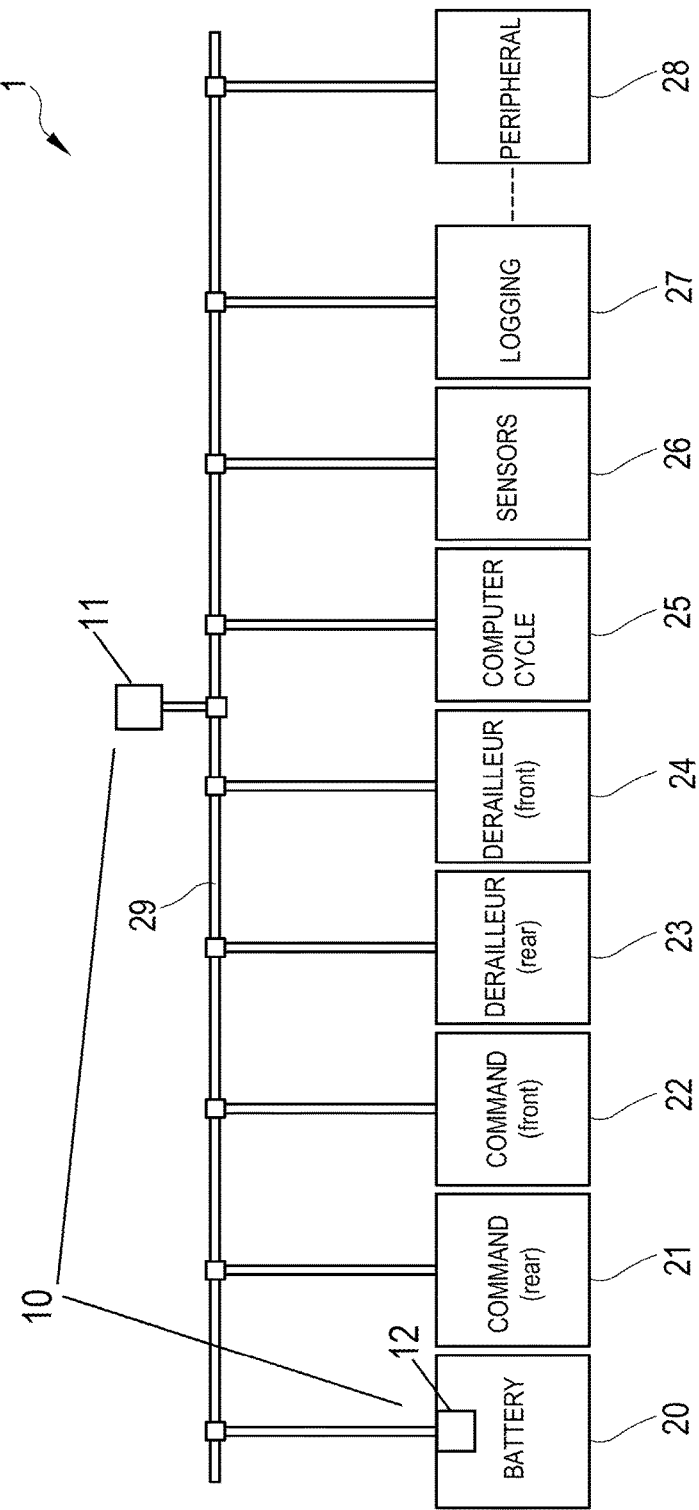

The present invention concerns a bicycle electronic system and a method for switching-off/(re)switching-on the same, as well as a battery unit; preferred characteristics of the bicycle electronic system and of the method for remote switching-off/(re)switching-on.

More particularly, in an aspect thereof the invention relates to a bicycle electronic system, the system comprising a battery unit, at least one operating unit and a power supply and communication bus, each of said units being connected to said bus.

Advantageously, the system comprises a first user activated/deactivated means or controller for switching-off/(re)switching-on and a second means or controller for switching-off/(re)switching-on suitable for disconnecting/connecting said battery unit, and in particular a power source thereof, from/to said power supply and communication bus in response to the activation/deactivation of said first means or controller for switching-off/(re) switching-on.

In the present description and in the attached claims, "connect" and "disconnect" and derived forms are used in the electrical sense.

In the present description and in the attached claims, under "operating unit" each unit of the system other than the battery unit is meant to be indicated.

A system with such a device for remote switching-off/(re)switching-on advantageously allows a user to switch off/(re)switch-on, in a simple and effective manner, the bicycle electronic system during long periods of immobility of the bicycle, preventing the bicycle electronic system from staying in a standby state during such long periods of immobility and thus preventing the battery unit from running down, all without physically accessing the battery unit. Since the battery unit, and more specifically a power source thereof, is disconnected from the power supply and communication bus, the power supply is actually removed for all of the operating units of the system that, therefore, is effectively switched off.

Advantageously, said power supply and communication bus comprises a ground cable, a power supply cable and a communication cable, preferably a single communication cable, more preferably a single serial communication cable.

In embodiments, the first means or controller for switching-off/(re)switching-on is removable from the rest of the bicycle electronic system. This advantageously prevents their accidental activation.

In an embodiment, the removable first means or controller for switching-off/(re)switching-on comprises a two terminal electrical connector configured to be connected/disconnected to/from the bicycle electronic system at any point of the supply and communication bus. This increases the versatility of the system.

The two terminal electrical connector can consist simply of a conductor wire, but in preferred embodiments it is a rigid connector, a sort of jumper.

In an embodiment, the two terminal electrical connector is configured to be connected/disconnected to/from the bicycle electronic system in place of any of said operating units, which is previously disconnected from the power supply and communication bus.

Such an embodiment advantageously minimizes the access points to the power supply and communication bus.

In embodiments, in the system there is provided at least one port configured for the removable connection of said two terminal electrical connector.

Preferably, the port is provided at at least one of said operating units.

Such an embodiment advantageously avoids the user to disconnect the operating unit from the power supply and communication bus for connecting the connector while the system is switched-off, and to reconnect the operating unit to the power supply and communication bus when the connector is disconnected while the system is being (re)switched-on.

In other embodiments, the first means or controller for switching-off/(re)switching-on is integrated in the bicycle electronic system and preferably comprise a bistable switch, more preferably provided at one of said operating units.

Preferably, the first means or controller for switching-off/(re)switching-on, in the activation condition, connects to each other a ground cable and a communication cable of the supply and communication bus.

Through such a provision a user-activated means or controller for switching-off/(re)switching-on is advantageously obtained that is extremely simple and that can be provided anywhere in the system. By choosing to connect together the ground cable and the communication cable, moreover, it is possible to avoid damaging the electrical and electronic components of the system, which could occur if the power supply cable of the supply and communication bus was involved instead.

Preferably, the second means or controller for switching-off/(re)switching-on is provided at the battery unit.

In an embodiment, the second means or controller for switching-off/(re)switching-on comprises a controlled switch and a first driver and a second driver to control a closed condition and an open condition of the controlled switch, respectively.

Preferably, the second means or controller for switching-off/(re)switching-on is connected between the battery unit and the power supply cable of the supply and communication bus.

More preferably, the controlled switch is configured to disconnect/connect a positive pole of a power source of the battery unit from/with a power supply cable of the supply and communication bus.

Preferably, the controlled switch is embodied by MOSFET technology, more preferably the controlled switch comprises an n-channel MOSFET and a p-channel MOSFET.

Preferably, the first driver and the second driver comprise resistors.

In an embodiment, the controlled switch comprises an n-channel MOSFET and a p-channel MOSFET, the drain of the n-channel MOSFET being connected to the gate of the p-channel MOSFET, the first driver setting the gate-source voltage of the p-channel MOSFET and the second driver setting the gate-source voltage of the n-channel MOSFET.

Preferably, the system comprises an insulation device between the second driver and a communication cable of the power supply and communication bus.

Preferably, said at least one operating unit comprises a manual command management unit and a derailleur management unit, each comprising more preferably a processor and a voltage regulator arranged between the processor and said power supply and communication bus.

Advantageously, the system further comprises a second manual command management unit and a second derailleur management unit, each comprising a processor and a voltage regulator arranged between the processor and said power supply and communication bus.

Advantageously, the system further comprises at least one other unit selected from the group consisting of a computer cycle, a sensor unit, a logging unit, a peripheral unit, each preferably comprising a processor and a voltage regulator arranged between the processor and said power supply and communication bus.

In one aspect, the invention concerns a battery unit for a bicycle electronic system comprising means or a controller for switching-off/(re)switching-on suitable for disconnecting/connecting said battery unit from/to a power supply and communication bus in response to the activation/deactivation of first means or controller for switching-off/(re)switching-on the bicycle electronic system.

Such a battery unit can be commercialised separately from the bicycle electronic system.

Such a battery unit can comprise one or more of the characteristics described above with reference to the bicycle electronic system.

In one aspect, the invention concerns a method for switching-off/(re)switching-on a bicycle electronic system, comprising:
when switching the system off:
activating, by a user, a first means or controller for switching-off/(re)switching-on; and
disconnecting, through a second means or controller for switching-off/(re)switching-on, battery unit from a power supply and communication bus in response to said activation;
when (re)switching the system on:
deactivating, by a user, the first means or controller for switching-off/(re)switching-on; and
connecting, through the second means or controller for switching-off/(re)switching-on, the battery unit to the supply and communication bus in response to said deactivation.

Preferably, activating said first means or controller for switching-off/(re)switching-on comprises connecting together a ground cable and a communication cable of the power supply and communication bus of said bicycle electronic system.

With reference to FIG. 1, a bicycle electronic system 1 comprises a battery unit 20 and one or more operating units 21-28 connected to a power supply and communication bus 29 or bus.

Preferably, the operating units comprise a manual command management unit 21, for example the one actuated with the right hand, and a derailleur management unit 23, for example the one associated with the rear wheel.

Preferably, but not necessarily, the bicycle electronic system 1 further comprises other units connected to the bus 29.

A second manual command management unit 22 and a second derailleur management unit 24 are thus shown, in the above example the one actuated with the left hand and the one associated with the axle of the pedal cranks, respectively.

In an alternative embodiment, there can be just the management unit of the front derailleur and the respective command, typically actuated with the left hand.

Among the other operating units that can be connected to the bus 29 in the bicycle electronic system 1 there are a computer cycle 25, a sensor unit 26, a logging unit 27, and a generic peripheral unit 28, for example a unit for detecting/processing the pedalling effort, remotely-positioned command units, namely one or more duplicated command units in different positions on the handlebars or elsewhere, etc.

The bus 29 preferably comprises three cables, as can be seen in FIGS. 2 to 5: a ground cable 30, a power supply cable 32 and a single serial communication cable 34. The ground cable 30 is the reference for all the differences in electrical potential of the system 1, the power supply cable 32 feeds all of the operating units 21-28 connected in the bicycle electronic system 1, and the serial communication cable 34 is used by all of the operating units 21-28 connected in the bicycle electronic system 1 to communicate service or error messages or commands.

Figure 2:
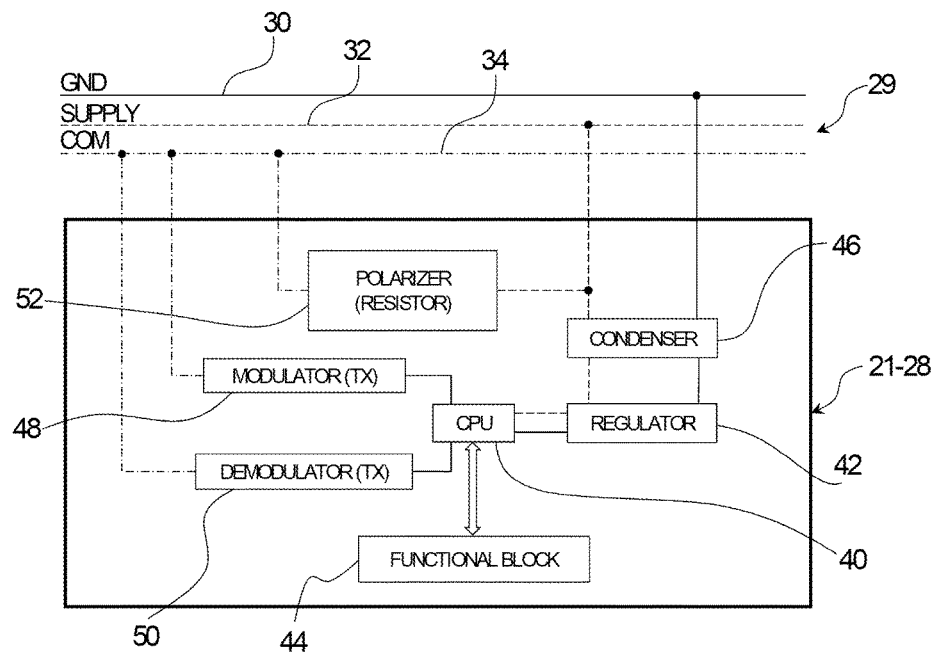
FIG. 2 is a block diagram of an illustrative operating unit of the bicycle electronic system of FIG. 1.

As shown in FIG. 2, each of the operating units 21-28 preferably comprises a processor 40 and a voltage regulator 42 arranged between the processor 40 and the bus 29, more specifically between its ground and power supply cables 30, 32.

The processor 40 controls and/or is controlled by devices specific for the operating unit 21-28 itself, depicted by a generic functional block 44. For example, in the case of the manual command management unit 21, 22 the functional block 44 typically comprises at least one or two switches to transmit, when their state is changed, an upward gearshifting request signal and/or a downward gearshifting request signal, respectively, as well as possibly actuation levers or buttons of the switches; in the case of the derailleur management unit 23, 24, the functional block 44 for example comprises a driving circuit of an electric motor and/or an electric motor for moving the chain guide element of the derailleur; in the case of the computer cycle 25, the functional block 44 for example comprises a display, control switches, a data and program memory; in the case of the sensor unit 26, the functional block 44 comprises one or more sensors of variables such as the travel speed, the cadence of rotation of the pedal cranks, the torque applied to the pedal cranks, the slope of the travel terrain, the heart rate of the cyclist and the like; in the case of the logging unit 27, the functional block 44 for example comprises a clock and a memory to store events and the respective times when they occurred; finally, in the case of a generic peripheral unit 28, the functional block 44 comprises one or more electronic devices controlled by or for controlling the processor 40; there could also be peripheral units 28 having just a processing function, without the functional block 44.

The provision of a voltage regulator 42 makes it possible to design each operating unit 21-28 with the processor 40 most suitable for the specific function of the unit itself, which as can be seen from the above can be highly variable. The voltage regulator 42, indeed, takes the power supplied by the battery 20 from the bus 29 and provides the most suitable voltage values for the processor 40.

Although it has not been shown, one or more of the electronic and electromechanical devices schematised by the functional block 44 can be directly connected to the ground 30 and power supply cables 32 to be supplied by the battery unit 20 through the bus 29.

A capacitive device 46, such as a small-capacity condenser, is preferably arranged between the voltage regulator 42 and the bus 29, more specifically between its ground and power supply cables 30, 32. Such a device has the function of allowing the power supply of the processor 40 for a brief period of time, for example a few milliseconds, sufficient to allow a delayed turning off of the processor 40 in the case of a lack of power supply on the bus 29, so that the processor 40 can take care of saving all the data and the current value of all of the variables in a non-volatile memory in the case of the lack of power supply.

Each operating unit 21-28 also preferably and advantageously comprises a modulator of the voltage on the communication cable or transmitter 48 and a demodulator of the voltage on the communication cable or receiver 50. The receiver 50 is shown as a self-standing block, but it can be incorporated in the processor 40.

The provision of a transmitter or modulator 48 and of a receiver or demodulator 50 in each unit connected in the bicycle electronic system 1 allows a direct communication between the various units. In particular, the manual command management units 21, 22 and/or the sensor unit 26 can communicate directly with the derailleur management units 23, 24 to directly impart upward and downward gearshifting commands and receive state messages of the derailleurs.

In some operating units 21-28 the transmitter 48 and/or the receiver 50 could be absent, of course giving up the ability to communicate (or the full ability) for such units.

Each operating unit 21-28 also optionally comprises a polarizer 52, for example a resistor, connected between the power supply cable 32 and the communication cable 34 to generate a known voltage on the communication cable 34.

Figure 3:
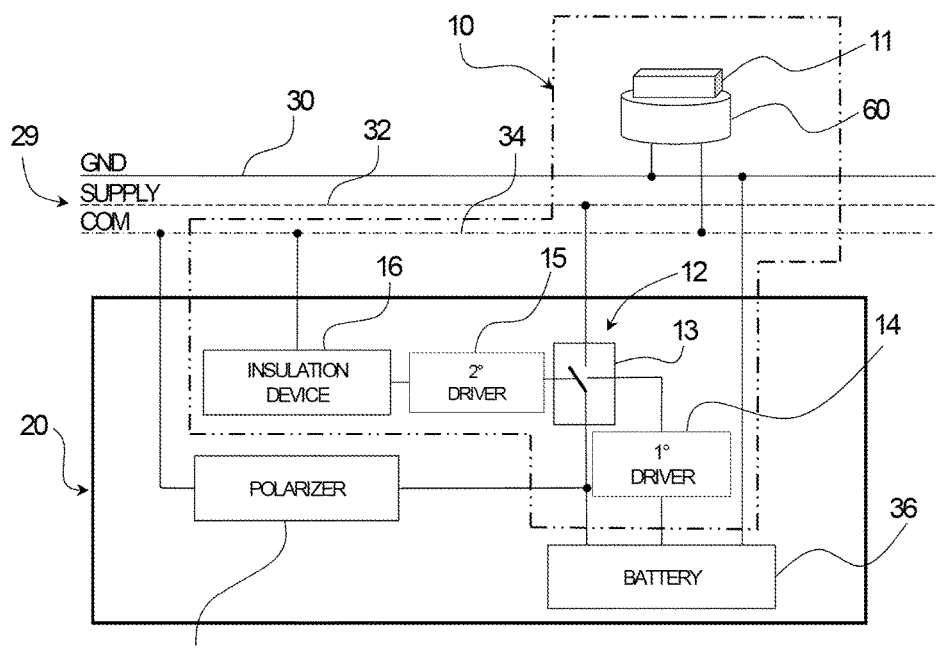
FIG. 3 is a block diagram of a battery unit and of a device for remote switching-off/(re)switching-on according to the invention, in the switched off state of the bicycle electronic system of FIG. 1.
Figure 4:
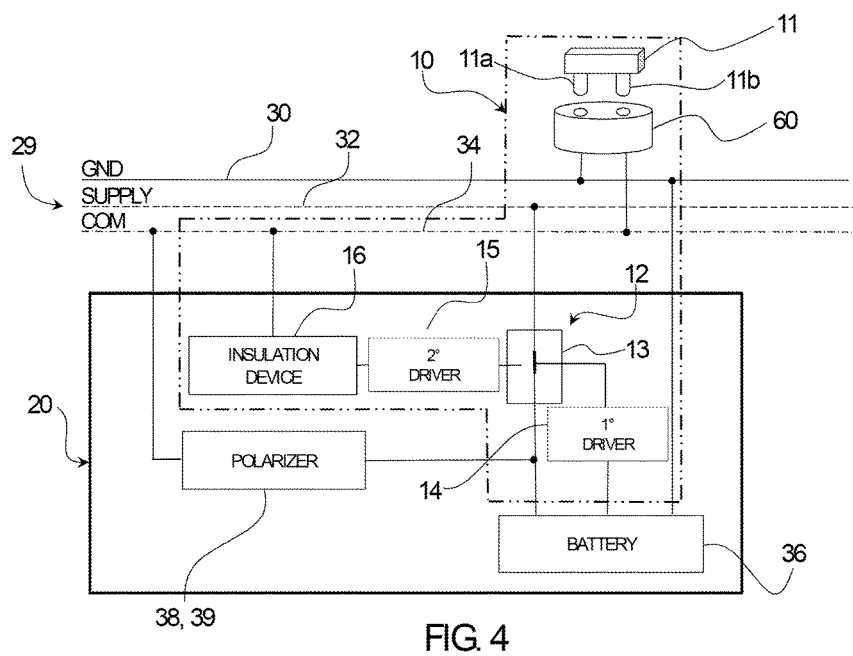
FIG. 4 is a block diagram, similar to that of FIG. 3, in the (re)switched-on state of the bicycle electronic system of FIG. 1.
Figure 5:
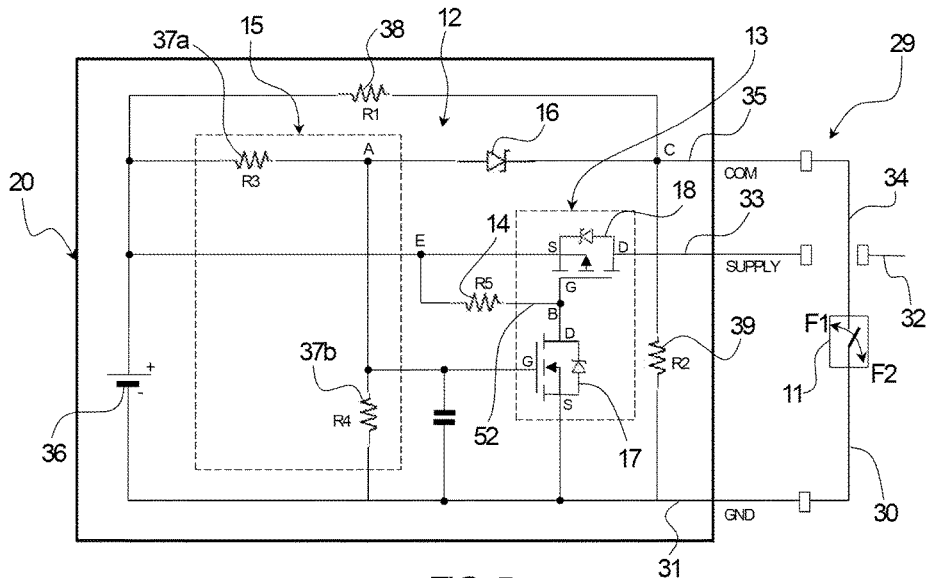
FIG. 5 is a circuit diagram of an embodiment of a battery unit and of a device for remotely switching-off/(re)switching-on the bicycle electronic system.

With reference to FIGS. 3-5, the battery unit 20 comprises a power source 36, such as a cell or battery or accumulator, which can also be formed of many cells, preferably rechargeable, typically connected in series. The battery 36 is connected between the ground and power supply cables 30, 32 (with the interposition of a controlled switch 13, better described in the following) to supply a voltage difference between the two cables available for the rest of the bicycle electronic system 1 through the bus 29.

The battery unit 20 also preferably comprises a polarizer 38, 39 connected between the power source 36 and the communication cable 34 to generate a known voltage on the communication cable 34.

With reference to FIGS. 1 and 3-5, the bicycle electronic system 1 according to the invention comprises a device 10 for remote switching-off/(re)switching-on.

The device 10 for remote switching-off/(re)switching-on comprises a first means or controller 11 for switching-off/(re)switching-on and a second means or controller 12 for switching-off/(re)switching-on responding to the first means or controller 11 for switching-off/(re)switching-on.

The first means or controller 11 for switching-off/(re)switching-on is able to be activated/deactivated by a user.

Advantageously, the first means or controller 11 for switching-off/(re)switching-on can be located anywhere in the power supply and communication bus 29. The position shown in FIG. 1, between the units 24 and 25, is merely indicative.

In embodiments that are not shown, the first means or controller 11 for switching-off/(re)switching-on are configured to be connected/disconnected to/from the bicycle electronic system 1 in place of any of the operating units 21-28, which is previously disconnected from the power supply and communication bus 29.

In an advantageous embodiment, as shown in FIGS. 3-4, the first means or controller 11 for switching-off/(re)switching-on comprise a connector 11 with two terminals 11a, 11b suitable for being connected by the user at a suitable port 60 provided in the power supply and communication bus 29. The connector 11 with two terminals 11a, 11b is preferably rigid, a sort of "jumper".

The port 60 is provided in a suitable position of the bicycle and preferably it is provided in at least one of the operating units 21-28.

Alternatively, the port 60 can be omitted; in this case, the connector 11 is connected directly to the cables of the power supply and communication bus 29. In this case, the first means or controller 11 for switching-off/(re)switching-on can comprise simply a conducting wire the ends of which are connected to the cables of the power supply and communication bus 29.

As a further alternative, the port 60 can be a port provided for the removable connection of an operating unit 21-28 in the bicycle electronic system 1.

Preferably and as shown, the first means or controller 11 for switching-off/(re)switching-on is configured to be connected by the user between the ground 30 and communication 34 cables of the bus 29.

More specifically, in the illustrated embodiment, the port 60 is preferably connected between the ground 30 and communication 34 cables of the bus 29. It should be understood that, if the port 60 is a port provided for the removable connection of an operating unit 21-28 in the bicycle electronic system 1, it will have three connections with all three cables of the bus 29 and three respective inputs, only two of which will be used for the means or controller 11 for switching off/(re)switching-on.

In particular, in connected or activated position of the first means or controller 11 for switching-off/(re)switching-on, which as will be understood later on is the switched off condition of the bicycle electronic system 1, shown in FIG. 3, the communication cable 34 is electrically connected to the ground cable 30 by the first means or controller 11 for switching-off/(re)switching-on; while in the non connected position of the first means or controller 11 for switching-off/(re)switching-on, which as will be understood later on is the (re)switched-on condition of the bicycle electronic system 1, shown in FIG. 4, the communication cable 34 is disconnected from the ground cable 30.

In the embodiment shown, the first means or controller 11 for switching-off/(re)switching-on is removable from the rest of the bicycle electronic system 1. This advantageously avoids an accidental activation of the means or controller 11 for switching-off/(re)switching-on and therefore undesired switching off of the system.

Alternatively, the first means or controller 11 for switching-off/(re)switching-on can be integrated in the system 1, for example in the form of a bistable switch, advantageously connected between the communication cable 34 and the ground cable 30 of the power supply and communication bus 29.

Such a bistable switch is preferably provided in at least one of the operating units 21-28 of the system 1.

With reference again to FIGS. 1, 3-5, the second means or controller 12 for switching-off/(re)switching-on is located at the battery unit 20, preferably inside it, and are configured to disconnect/connect the battery 36, in particular its power source 36, from/to the power supply and communication bus 29, in particular from/to the power supply cable 32, in response to the connection/disconnection of the first means or controller 11 for switching-off/(re)switching-on to/from the system 1 by the user, in other words in response to the activation/deactivation of the first means 11 or controller for switching-off/(re)switching-on by the user.

Preferably, the second means or controller 12 for switching-off/(re)switching-on comprises a controlled switch 13 and a first and a second driver, 14 and 15 respectively. The first driver 14 and the second driver 15 are used to control a closed condition and an open condition of the controlled switch 13, respectively.

The controlled switch 13 is configured to connect/disconnect the power source 36 of the battery unit 20, preferably a positive pole thereof, with/from the power supply cable 32 of the power supply and communication bus 29.

The first driver 14 is connected between the battery 36 and the controlled switch 13 and, when the connector 11 is not connected to the system 1 and therefore the bicycle electronic system 1 is switched on (FIG. 4), keeps the controlled switch 13 closed, connecting the power source 36 to the power supply cable 32 of the bus 29.

The second driver 15 is connected between the controlled switch 13 and the communication cable 34—indirectly, as will be explained shortly—and, when the connector 11 is connected (FIG. 3), it opens the controlled switch 13 disconnecting the power source 36 from the power supply cable 32. The bicycle electronic system 1 therefore switches off.

It should be noted that the second means or controller 12 for switching-off/(re)switching-on is overall arranged between the communication cable 34 and the ground cable 30, so that they respond to the difference in voltage existing between the two cables 30, 34 as set through the first means or controller 11 for switching-off/(re)switching-on.

In particular, the second driver 15 is overall arranged between the communication cable 34—indirectly, as will be explained shortly—and the ground cable 30, so that it responds to the difference in voltage existing between the two cables 30, 34 as set through the first means or controller 11 for switching-off/(re)switching-on.

An insulation device 16 is preferably arranged between the second driver 15 and the bus 29, specifically its communication cable 34. Such an insulation device 16 has the function of insulating the second driver 15 from the communications in transit on the communication cable 34, in the switched on state of the system 1, to avoid undesired switching of the second means or controller 12 for switching-off/(re)switching-on.

FIG. 5 is a circuit diagram of an embodiment of the battery unit 20 and of the device 10 for switching-off/(re)switching-on.

The power source 36 (battery or accumulator, possibly formed from many cells connected in series), is connected between a cable 31 leading to the ground cable 30 of the bus 29 and a cable 33 leading to the power supply cable 32 of the bus 29, with the interposition of a p-channel MOSFET 18 part of the controlled switch 13 (see later). The connection node between the positive pole of the power source 36 and the source S of the p-channel MOSFET 18 is indicated as node E.

The polarizer 38, 39 of the battery unit 20 is preferably embodied by a pair of resistors R1 38 and R2 39, connected in series between the poles of the power source 36, as well as between cables 31, 35 leading to the ground cable 30 and to the communication cable 34 of the bus 29. The connection node between the resistors R1 38 and R2 39 is indicated as node C.

The resistors R1 38 and R2 39 of the polarizer embody a voltage divider and establish a predetermined voltage—hereinafter also called quiescence voltage—at the node C in a switched on condition of the system 1 (through the device 10 for switching-off/(re)switching-on), as described more clearly hereinafter.

The second driver 15 is preferably embodied by a pair of resistors R3 37a, R4 37b connected in series between the poles of the power source 36. The connection node between the resistors R3 37a, R4 37b is indicated as node A.

The resistors R3 37a, R4 37b of the second driver 15 embody a voltage divider and establish a predetermined voltage at the node A in a switched on condition of the system 1 (through the device 10 for switching-off/(re)switching-on), as described more clearly hereinafter.

The controlled switch 13 is preferably embodied by an n-channel MOSFET 17 and the aforementioned p-channel MOSFET 18, connected between the power source 36, the node A and cables 31, 33 leading to the ground cable 30 and to the power supply cable 32 of the bus 29.

In particular, the n-channel MOSFET 17 has the source S connected to the negative pole of the power source 36 and to the cable 31 leading to the ground cable 30; the drain D connected to the gate G of the p-channel MOSFET 18 at a node indicated with B; and the gate G connected to the node A of the second driver 15. The n-channel MOSFET 17 is therefore driven by the second driver 15, as described more clearly hereinafter.

The p-channel MOSFET 18 has the source S connected to the positive pole of the battery 36 at a node indicated with E; the gate G connected to the drain D of the n-channel MOSFET 17 at the node B as stated above; and the drain D connected to the cable 33 leading to the power supply cable 32 of the bus 29.

The first driver 14 is preferably embodied by a resistor R5 14 connected between the gate G and the source S of the p-channel MOSFET 18, namely between the aforementioned nodes B and E. The p-channel MOSFET 18 is therefore driven by the first driver 14, as described more clearly hereinafter.

Preferably, the insulation device 16 is embodied by a Schottky diode 16 arranged between the aforementioned nodes A and C, namely between the cable 35 leading to the communication cable 34 of the bus 29 and the second driver 15.

The operation of the bicycle electronic system will now be illustrated more clearly with reference to the circuit diagram of FIG. 5.

It is assumed that a user, due to stowing the bicycle for the winter, wishes to switch the bicycle electronic system 1 off using a device 10 for switching-off/(re)switching-on according to the invention. This is in order to avoid leaving the system 1 in standby, which is a condition that could lead to the battery running down, with obvious drawbacks for the user.

For this purpose, the user simply connects the connector 11 to the port 60 of the bicycle electronic system 1—if necessary disconnecting/removing an operating unit 21-28 possibly connected to such a port 60 or a possible protective cover of the inputs of the port 60. In this way, the ground 30 and communication 34 cables of the bus 29 are connected to each other (arrow F1).

As described above, the user can take care of connecting to each other the ground 30 and communication 34 cables of the bus 29 through application of a conductive wire between them, without a dedicated port 60 being provided for a dedicated connector 11, or of changing state of the bistable switch integrated in the bicycle electronic system 1.

Following the connection to each other of the ground 30 and communication 34 cables of the bus 29, the voltage on the cable 35 leading to the communication cable 34 goes to zero and in particular the voltage $V_C$ at the node C goes to zero ($V_C=0$). The voltage $V_A$ at the node A takes on a value corresponding to the direct voltage of the Schottky diode 16, for example equal to about 0.2 Volts ($V_A=0.2$ Volts). The voltage at the gate G of the n-channel MOSFET 17 is therefore $V_G=V_A$, sufficiently small, for example 0.2 Volts, so that the voltage between gate G and source S of the n-channel MOSFET 17 is $V_{GS}<V_{t1}$, $V_{t1}$ being a threshold conduction voltage of the n-channel MOSFET 17. The n-channel MOSFET 17 is thus open, or cut-off. It follows that in the resistance R5 of the second driver 14 current does not flow and the voltage at the node E is equal to the voltage at the node B ($V_E=V_B$). As a result the voltage between gate G and source S of the p-channel MOSFET 18 is equal to zero ($V_{GS}=0$), namely greater than its threshold conduction voltage. The p-channel MOSFET 18 is therefore open, or cut-off. The power source 36 of the battery unit 20 is thus actually disconnected from the power supply cable 32 of the bus 29. The other operating units 21-28 therefore are not supplied with power and the system 1 indeed switches off.

It is now assumed that a user wishes to (re)switch the bicycle electronic system 1 on using a device 10 for switching-off/(re)switching-on according to the invention.

For this purpose, the user simply disconnects the connector 11 from the port 60 of the bicycle electronic system—(re)connecting if necessary an operating unit 21-28 to such a port 60—, thus disconnecting (arrow F2) the ground 30 and communication 34 cables of the bus 29 from one another. The disconnection can alternatively take place, by the user, through the removal of the conductive wire described above or through the switching of the bistable switch integrated in the bicycle electronic system 1.

Following the disconnection of the communication cable 34 from the ground cable 30, the voltage on the cable 35 leading to the communication cable 34 and in particular the voltage at the node C then passes from the value $V_C=0$ to a constant value, equal to the quiescence voltage $V_q$ on the communication cable 34 of the bus 29. The quiescence voltage $V_q$ is set by the resistors R1 38, R2 39 of the polarizer of the battery unit 20. The term quiescence voltage $V_q$ also indicates the voltage measured on the communication cable 34 when in no operating unit 21-28 of the system 1 is the modulator or transmitter 48 activated. The quiescence voltage $V_q$ is set so as to be greater than the voltage $V_A$ at the node A, set by the resistors R3 37a and R4 37b of the second driver 15.

It should indeed be noted that the fact that the quiescence voltage $V_q$ taken up by the node C in this condition is set so as to be greater than the voltage $V_A$ at the node A means that the Schottky diode of the insulation device 16 is open or cut-off, so that the node A of the second driver 15 is effectively insulated from the communication cable 34 of the bus 29. Therefore, unwanted interference on the communication cable 34 is prevented from causing unwanted switching of the n-channel MOSFET 17.

The voltage $V_A$ at the node A, therefore set by the resistors R3 37a and R4 37b of the second driver 15, is also set at a value such that the voltage between gate G and source S of the n-channel MOSFET 17 is $V_{GS}>V_{t2}$, $V_{t2}$ being a threshold conduction voltage of the n-channel MOSFET 17. The n-channel MOSFET 17 is therefore closed or in an on-state. The voltage $V_B$ at the node B therefore goes to zero ($V_B=0$). Since the voltage $V_E$ at the node E is equal to the voltage of the power source 36, the voltage between gate G and source S of the p-channel MOSFET 18 is negative, the p-channel MOSFET 18 is closed or in an on-state and the voltage on the cable 33 leading to the power supply cable 32 of the power supply and communication bus 29 coincides with the voltage of the node E, namely with the voltage supplied by the battery unit 20. The power source 36 of the battery unit 20 is thus actually connected to the power supply cable 32 of the bus 29. The other operating units 21-28 are therefore supplied with power and the system 1 indeed switches on.

The system 1 described above represents an advantageous implementation of a method for remotely switching-off/(re)switching-on a bicycle electronic system 1 according to the invention.

Such a method comprises:
when switching the system 1 off:
activating, by a user, first means or controller 11 for switching-off/(re)switching-on; and
disconnecting, through second means or controller 12 for switching-off/(re)switching-on, a battery unit 20 from a power supply and communication bus 29 in response to said activation;
when (re)switching the system on:
deactivating, by a user, the first means or controller 11 for switching-off/(re)switching-on; and
connecting, through the second means or controller 12 for switching-off/(re)switching-on, the battery unit 20 to the power supply and communication bus in response to said deactivation.

Preferably, activating the first means or controller 11 for switching-off/(re)switching-on comprises connecting together a ground cable 30 and a communication cable 34 of the power supply and communication bus 29 of the bicycle electronic system 1.

From the description that has been made, the characteristics of the device and method for switching-off/(re)switching-on the bicycle electronic system object of the present invention are clear, just as the relative advantages are also clear.

Further variants of the embodiments described above are possible, without departing from the teaching of the invention.

For example, the power supply and communication bus could comprise many communication cables.

Alternatively or in addition, one or more of the operating units could be free of the regulator and/or processor, as well as—as already stated—of one and/or the other of the transmitter and the receiver.

In alternative embodiments, in place of the controlled switch closed and opened by the first driver and by the second driver, there could be a monostable controlled switch, of the normally open or normally closed type, respectively, and a single driver to control a closed condition or open condition of the controlled switch, respectively.

Finally, it is clear that the switching-off/(re)switching-on device and method thus conceived are subject to undergo several modifications and variants, all encompassed by the invention; moreover, all of the details can be replaced by technically equivalent elements. In practice, the materials used, as well as the sizes, can be whatever according to the technical requirements.

What is claimed is:
1. A bicycle electronic system, the system comprising a battery unit, at least one operating unit and a power supply and communication bus, each of said units being connected to said bus, further comprising:
a first user operated controller that is activated for switching-off and deactivated for (re)switching-on, and
a second controller for disconnecting said battery unit from said power supply and communication bus for switching-off, and for connecting said battery unit to said power supply and communication bus for switching-on, whereby any connection between said battery unit and said at least one operating unit is disabled in response to the activation of said first user operated controller and is enabled in response to the deactivation of said first user operated controller.

2. The system according to claim 1, wherein said first user operated controller is removable from a remainder of the bicycle electronic system.

3. The system according to claim 2, wherein said removable first user operated controller comprises an electrical connector with two terminals configured to be connected/disconnected to/from the bicycle electronic system at any selected location of the power supply and communication bus.

4. The system according to claim 3, wherein said electrical connector with two terminals is configured to be connected/disconnected to/from the bicycle electronic system in place of any of said operating units.

5. The system according to claim 3, comprising at least one port configured for a removable connection of said electrical connector with two terminals.

6. The system according to claim 5, wherein said port is provided at least one of said operating units.

7. The system according to claim 1, wherein said first user operated controller is integrated in the bicycle electronic system.

8. The system according to claim 7, wherein said first controller comprises a bistable switch.

9. The system according to claim 8, wherein said bistable switch is at one of said operating units.

10. The system according to claim 1, wherein said first user operated controller, in an activation condition, connects to each other a ground cable and a communication cable of the power supply and communication bus.

11. The system according to claim 1, wherein said second controller is provided at the battery unit.

12. The system according to claim 1, wherein said second controller comprises a controlled switch and a first driver and a second driver to control a closed condition and an open condition of the controlled switch, respectively.

13. The system according to claim 12, wherein the controlled switch is configured to disconnect/connect a positive pole of a power source of the battery unit from/with a power supply cable of the power supply and communication bus.

14. The system according to claim 12, wherein the controlled switch comprises an n-channel MOSFET and a p-channel MOSFET, a drain of the n-channel MOSFET being connected to a gate of the p-channel MOSFET, the first driver setting a gate-source voltage of the p-channel MOSFET and the second driver setting a gate-source voltage of the n-channel MOSFET.

15. The system according to claim 1, wherein said at least one operating unit includes at least two operating units, and any connection between said battery unit and said at least two operating units is disabled in response to the activation of said first user operated controller and is enabled in response to the deactivation of said first user operated controller.

16. A battery unit for a bicycle electronic system comprising a first controller for disconnecting said battery unit from a power supply and communication bus and connecting said battery unit to the power supply and communication bus, whereby any connection between said battery unit and at least one operating unit is:

disabled in response to the activation of a second user operated controller, and enabled in response to the deactivation of said second user operated controller.

17. A method for switching-off/(re)switching-on a bicycle electronic system, comprising:

when switching the system off:
activating, by a user, a first user operated controller that is activated for switching-off; and
disconnecting, through a second controller, a battery unit from a power supply and communication bus so that a connection between said battery unit and at least one operating unit is disabled in response to said activation;

when (re)switching the system on:
deactivating, by a user, the first user operated controller; and
connecting, through the second controller, the battery unit to the power supply and communication bus so that a connection between said battery unit and said at least one operating unit is enabled in response to said deactivation.

18. The method according to claim 17, wherein activating said first user operated controller comprises connecting together a ground cable and a communication cable of the supply and communication bus of said bicycle electronic system.

* * * * *